United States Patent [19]

Komuro et al.

[11] Patent Number: 4,983,989

[45] Date of Patent: Jan. 8, 1991

[54] PRINTING CONTROL SYSTEM FOR THERMAL PRINTER

[75] Inventors: Sintaro Komuro; Yasushi Nitta; Ryuichi Hatanaka, all of Tokyo, Japan

[73] Assignee: NEC Corporation, Tokyo, Japan

[21] Appl. No.: 112,930

[22] Filed: Oct. 27, 1987

[30] Foreign Application Priority Data

Oct. 30, 1986 [JP] Japan .................................. 61-256892

[51] Int. Cl.[5] .............................................. G01D 9/00

[52] U.S. Cl. ................................ 346/1.1; 346/76 PH; 400/120

[58] Field of Search ........................... 346/76 PH, 1.1; 358/296, 298; 400/120; 364/518, 519

[56] References Cited

U.S. PATENT DOCUMENTS 4,415,907 11/1983 Suemori ......................... 346/76 PH 4,663,736 5/1987 Berry .............................. 346/76 PH

FOREIGN PATENT DOCUMENTS 0023766 1/1987 Japan ............................. 346/76 PH

*Primary Examiner*—Clifford C. Shaw

*Assistant Examiner*—Huan Tran

*Attorney, Agent, or Firm*—Sughrue, Mion, Zinn, Macpeak & Seas

[57] ABSTRACT

A printing control system includes a recording head having a plurality of heating resistor elements and a head driver for driving the recording head and calculates printing data to be sent to the head driver according to logical calculations using printing data one and two steps ahead of the current step. A printing time of the data is divided into a plurality of time intervals. The logical operations are performed according to different algorithms every time interval. The printing data of the respective time intervals are printed. By combining the data printed during the previous time intervals, the density of the current printing data is determined.

5 Claims, 5 Drawing Sheets

PRINTING CONTROL SYSTEM FOR THERMAL PRINTER

BACKGROUND OF THE INVENTION

The present invention relates to a printing control system for a thermal printer and, more particularly, to a method and apparatus for controlling printing in a thermal printer.

Thermal printers have been popular as facsimile printers or the like, and various methods and circuit arrangements for controlling printing have been developed and used in practice.

A typical conventional thermal printer control system is a printing pulse control circuit for a thermal printing head described in U.S. Pat. No. 4,415,907. In the thermal printer in this prior art, in order to control heat generated by heating resistor elements during printing, the grade of heat accumulation in the printing head is analyzed on the basis of the number of dots of high level (to be referred to as "H" dots hereinafter) in the preceding dot line of the printing data. A printing pulse width is changed according to the analysis result, thereby preventing degradation of print quality which is caused by remaining heat.

In the technique described above for changing the printing pulse width in units of dot lines, when "H" dots appear continuously in a dot line, i.e., when the dot level in a direction perpendicular to the dot line is not changed, a nonuniform density distribution of the dots can be prevented. However, when the "H" dots in a dot line are not continuous and a distance between the adjacent "H" dots is increased, a nonuniform density distribution undesirably occurs.

The conventional problem will be described with reference to Table 1 below.

TABLE 1

| | First Dot Line | Second Dot Line | Third Dot Line |
|---|---|---|---|
| Dot 1 | ● | ● | ● |
| Dot 2 | ● | ● | ● |
| Dot 3 | ● | ● | ○ |
| Dot 4 | ● | ● | ○ |
| Dot 5 | ○ | ● | ○ |
| Dot 6 | ○ | ● | ○ |
| Dot 7 | ○ | ○ | ○ |
| Dot 8 | ○ | ○ | ● |

One dot line consists of Dot 1 to Dot 8 which correspond to the heating resister elements, and a solid dot represents an "H" dot, and a hollow dot represents a dot of low level ("L" dot). Propositions (1) to (3) are assumed as follows:

(1) If six "H" dots or more are present in one dot line, the grade of heat accumulation is high and the printing pulse width of the next dot line is set to be a short width WS;

(2) If three to five "H" dots are present in one dot line, the grade of heat accumulation is moderate and the printing pulse width of the next dot line is set to be an intermediate width WM; and (3) If two "H" dots or less are present in one dot line, the grade of heat accumulation is low and the printing pulse width of the next dot line is set to be a long width WL.

Under these propositions, assume that first, second, and third dot lines having 4 , 6, and 3 "H" dots are sequentially printed. Since there is no dot line preceding the first dot line, the long width WL as the printing pulse width is selected for the first dot line. Since the preceding dot line, i.e., the first dot line, of the second dot line has four "H" dots, the intermediate width WM as the printing pulse width is selected for the second dot line. Since the preceding dot line, i.e., the second dot line, of the third dot line has six "H" dots, the short width WS as the printing pulse width WS is selected for the third dot line.

The printing densities of the columns DOT1 and DOT 2 having all "H" dots are uniform, respectively, due to effects obtained by selection of pulse widths taken in consideration of the grade of heat accumulation. However, on the column DOT8, the first and second dot lines do not have printing data, i.e., "L" dots and the grade of heat accumulation is substantially low, the printing density of "H" dot for the third dot line is low because the pulse width for the third dot line is the short width WS.

In the conventional case described above, since the printing pulse width, that is, the energization time of the heating resistor elements is changed in units of dot lines in accordance with the grade of heat accumulation of the recording head as a whole, it is impossible to energize the respective heating resistor elements in accordance with different grades of heat accumulation in units of heating resistor elements.

SUMMARY OF THE INVENTION

It is an object of the present invention to provide a method and apparatus for controlling printing in a thermal printer, which is free from the conventional drawbacks described above.

According to an aspect of the present invention, there is provided a method of controlling printing in a thermal printer, the method being adapted to control a printing density of a dot corresponding to each of a plurality of heating resistor elements by controlling energization times of the plurality of heating resistor elements, wherein a logical operation is performed on the basis of printing data one and two steps ahead of a current step, thereby determining printing data of the current step.

Furthermore, the printing time of the current printing data is divided into a plurality of time intervals, the logical operations are performed according to different algorithms every time interval so as to perform appropriate printing for each time interval, and the density of the current printing data is determined by combining printing data of the previous time intervals.

According to another aspect of the present invention, there is provided a printing control apparatus in a thermal printer, comprising a recording head having a plurality of heating resistor elements, processor means for preparing and storing data sent from a host computer and calculating and outputting current printing data by logical operations on the basis of printing data one and two steps ahead of a current step, means for parallel/serial converting output data from the processor means, and head driver means for generating an ON/OFF pulse signal for heating resistor elements of the recording head on the basis of output data from the parallel/serial converting means.

DETAILED DESCRIPTION OF THE PREFERRED EMBODIMENT

Figure 1:
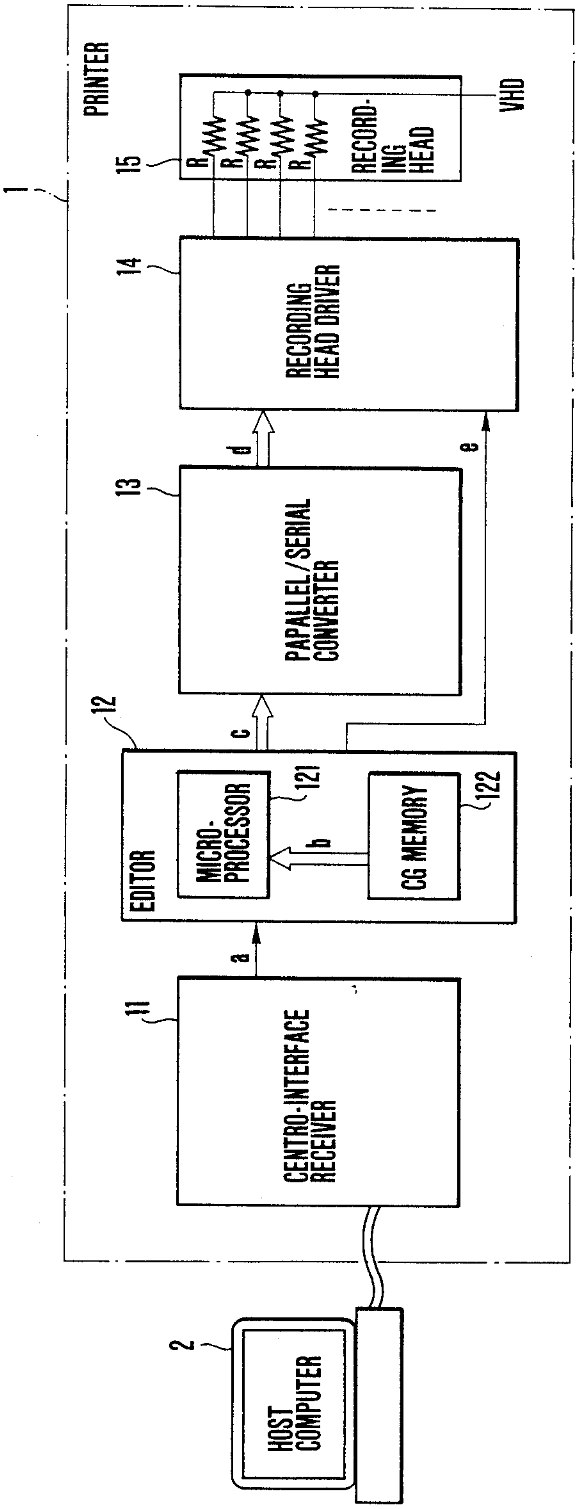
FIG. 1 is a block diagram showing an entire system configuration according to the present invention.

FIG. 1 is a block diagram showing a method of controlling printing in a thermal printer according to an embodiment of the present invention. Referring to FIG. 1, reference numeral 1 denotes a printer; and 2, a host computer. The printer 1 comprises a centro-interface receiver 11 for receiving data from a host computer 2, an editor 12 for receiving reception data a from the centro-interface receiver 11 and outputting output data c and a printing pulse e, a parallel/serial converter 13 for converting the parallel output data c into serial output data d, a recording head driver 14 for receiving the output data d and the printing pulse e and outputting a drive signal, and a recording head 15 driven by the recording head driver 14 and having a plurality of heating resistor elements R. The editor 12 comprises a microprocessor 121 having an 8-bit memory and a CG memory 122 for storing CG font data.

The reception data a received from the host computer 2 is input to the editor 12 through the centro-interface receiver 11. The CG font data coinciding with the input reception data a is read out as editor data b from the CG memory. The output data c is generated on the basis of the printing data one and two steps ahead of the current step, which are stored in the microprocessor 121.

Formation of the output data c will be described with reference to Tables 2, 3, and 4.

TABLE 2

| | First Dot Line | Second Dot Line | Third Dot Line |
|---|---|---|---|
| Dot 1 | ○ | ○ | ● |
| Dot 2 | ● | ○ | ● |
| Dot 3 | ○ | ● | ● |
| Dot 4 | ● | ● | ● |

TABLE 3

| Dot Line Information | First Dot Line | | | Second Dot Line | | | Third Dot Line | | |
|---|---|---|---|---|---|---|---|---|---|
| | ED0 | ED1 | ED2 | ED0 | ED1 | ED2 | ED0 | ED1 | ED2 |
| Dot 1 | ○ | ○ | ○ | ○ | ○ | ○ | ○ | ○ | ● |
| Dot 2 | ○ | ○ | ● | ○ | ● | ○ | ● | ○ | ● |
| Dot 3 | ○ | ○ | ○ | ○ | ○ | ● | ○ | ● | ● |
| Dot 4 | ○ | ○ | ● | ○ | ● | ● | ● | ● | ● |

The solid dot represents an "H" dot, and the hollow dot represents an "L" dot. Table 2 shows editor data b obtained by developing the reception data a into CG font data by the microprocessor 121. Dots 1 to 4 correspond to the heating resistor elements R of the recording head 15 shown in FIG. 1. Dot 1 to Dot 24 are used in a 24-dot printer. Table 3 is a history table of editor data b one (ED1) and two (ED0) steps ahead of the current step (ED2).

Figure 5:
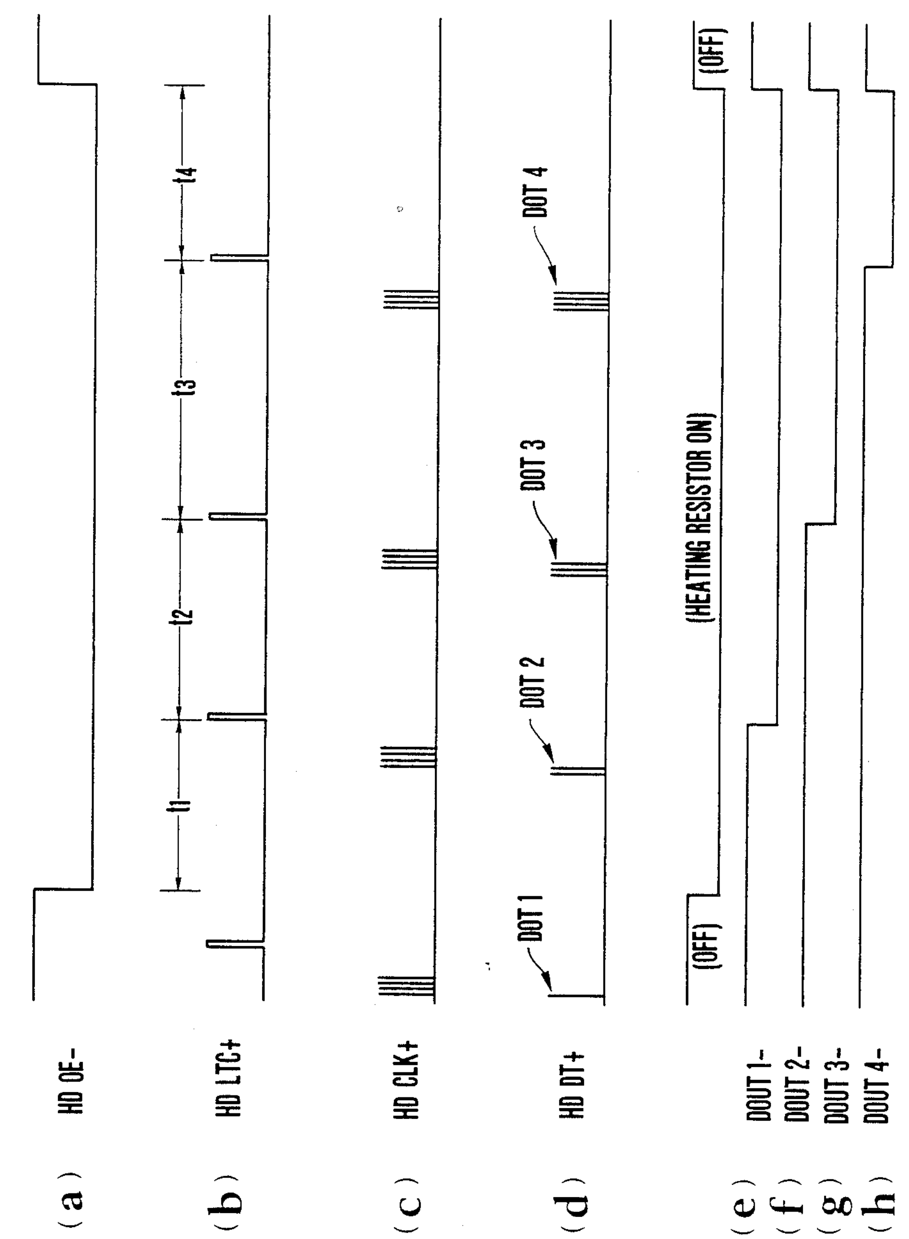
FIGS. 5(*a*) to 5(*h*) are timing charts showing timings of signals generated in the printing control apparatus shown in FIG. 2.

When the editor data b as output data is supplied to the recording head driver 14, a duration of high level of the printing pulse e is divided into four time intervals t1, t2, t3, and t4, as shown in FIG. 5(*b*). The output data of the respective time intervals are calculated using the editor data ED0, ED1, and ED2 as follows:

$$\text{Output data for } t1 = \overline{(ED0 + ED1)} \bullet ED2$$

$$\text{Output data for } t2 = ED1 \cdot ED2$$

$$\text{Output data for } t3 = \overline{(ED0 \cdot ED1)} \bullet ED2$$

$$\text{Output data for } t4 = ED2$$

where + represents an OR operator,   represents an AND operator, and an upper line represents a complement. For example, for the first dot line in Table 2, ED0=(0,0,0,0), ED1=(0,0,0,0), and ED2=(0,1,0,1) are obtained from the first dot line data in Table 3. Therefore, the output data for the time intervals t1 to t4 are given as follows:

$$\begin{aligned}
\text{Output data for } t1 &= \overline{((0,0,0,0) + (0,0,0,0))} \cdot (0,1,0,1) \\
&= (0,1,0,1) \\
\text{Output data for } t2 &= \overline{(0,0,0,0)} \cdot (0,1,0,1) \\
&= (0,1,0,1) \\
\text{Output data for } t3 &= \overline{((0,0,0,0) + (0,0,0,0))} \cdot (0,1,0,1) \\
&= (0,1,0,1) \\
\text{Output data for } t4 &= (0,1,0,1)
\end{aligned}$$

Since the data one and two steps ahead of the current step in the first dot line are "L" dots, the grade of heat accumulation is low. Therefore, the output data for the time intervals t1 to t4 are current editor data ED2.

Similarly, the logical operations are performed for the second and third dot lines. Table 4 shows output data for the respective time intervals.

TABLE 4

| | First Dot Line | | | | Second Dot Line | | | | Third Dot Line | | | |
|---|---|---|---|---|---|---|---|---|---|---|---|---|
| | t1 | t2 | t3 | t4 | t1 | t2 | t3 | t4 | t1 | t2 | t3 | t4 |
| Dot 1 | | | | | | | | | ● | ● | ● | ● |
| Dot 2 | ● | ● | ● | ● | | | | | | ● | ● | ● |
| Dot 3 | | | | | ● | ● | ● | ● | | | ● | ● |
| Dot 4 | ● | ● | ● | ● | | | ● | ● | | | | ● |

The output data c shown in Table 4 is sent to the recording head driver 14 through the parallel/serial converter 13 and printed as the printing data by the recording head 15.

Figure 2:
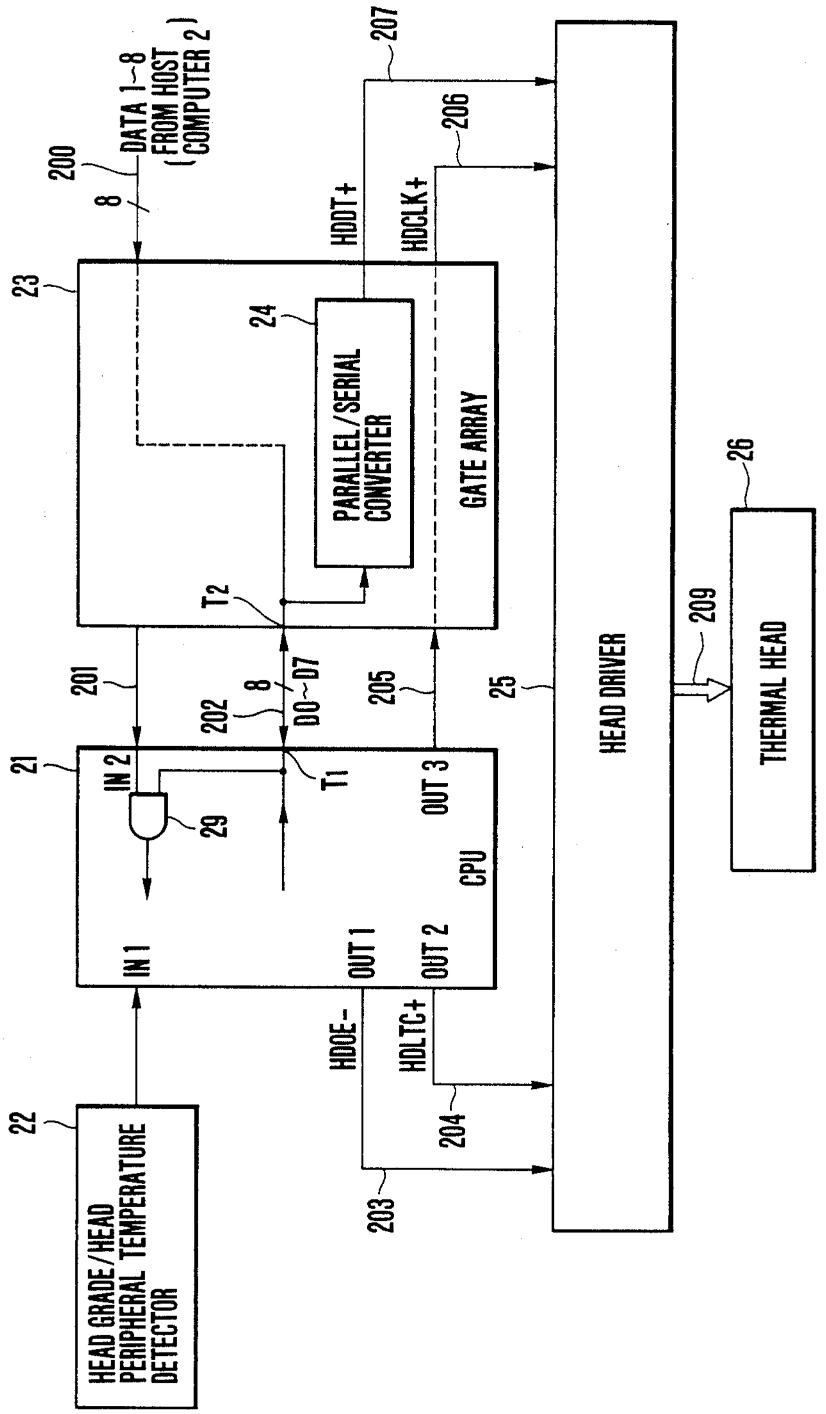
FIG. 2 is a block diagram showing an overall arrangement of a printing control apparatus according to the present invention.

FIG. 2 is a block diagram of a printing control apparatus for a thermal printer according to the embodiment of the present invention.

Referring to FIG. 2, a head grade/head peripheral temperature detector 22 for detecting the grade of heat accumulation of the head and the peripheral or ambient temperature is connected to an input terminal IN1 of a CPU 21. A data reception interruption signal is supplied from the host computer to an input terminal IN2 of the CPU 21 through a line 201. An input/output terminal T1 of the CPU 21 and an input/output terminal T2 of a gate array 23 are connected through a bidirectional data line 202. The input terminal IN2 and the input/output terminal T1 in the CPU 21 are connected to the two input terminals of an AND gate 29. The output terminal of the AND gate 29 is connected to a processing circuit, not shown, of the CPU 21.

Output terminals OUT1 and OUT2 of the CPU 21 are connected to a head driver 25 through corresponding lines 203 and 204. A head driver enable signal HDOE- and a head driver latch signal HDLTC+ are output from the output terminals OUT1 and OUT2, respectively. A clock signal for the head driver 25 is output from an output terminal OUT3 to the gate array 23 through a line 205. This clock signal is converted into a head driver clock signal HDCLK+ by the gate array 23, and the signal HDCLK+ is supplied to the head driver 25 through a line 206.

The input/output terminal T2 of the gate array 23 is connected to the input terminal of the parallel/serial converter 24. The parallel/serial converter 24 supplies serial head data HDDT+ to the head driver 25 through a line 207.

The head driver 25 outputs the printing data to a thermal head 26 through a line 209.

Figure 3:
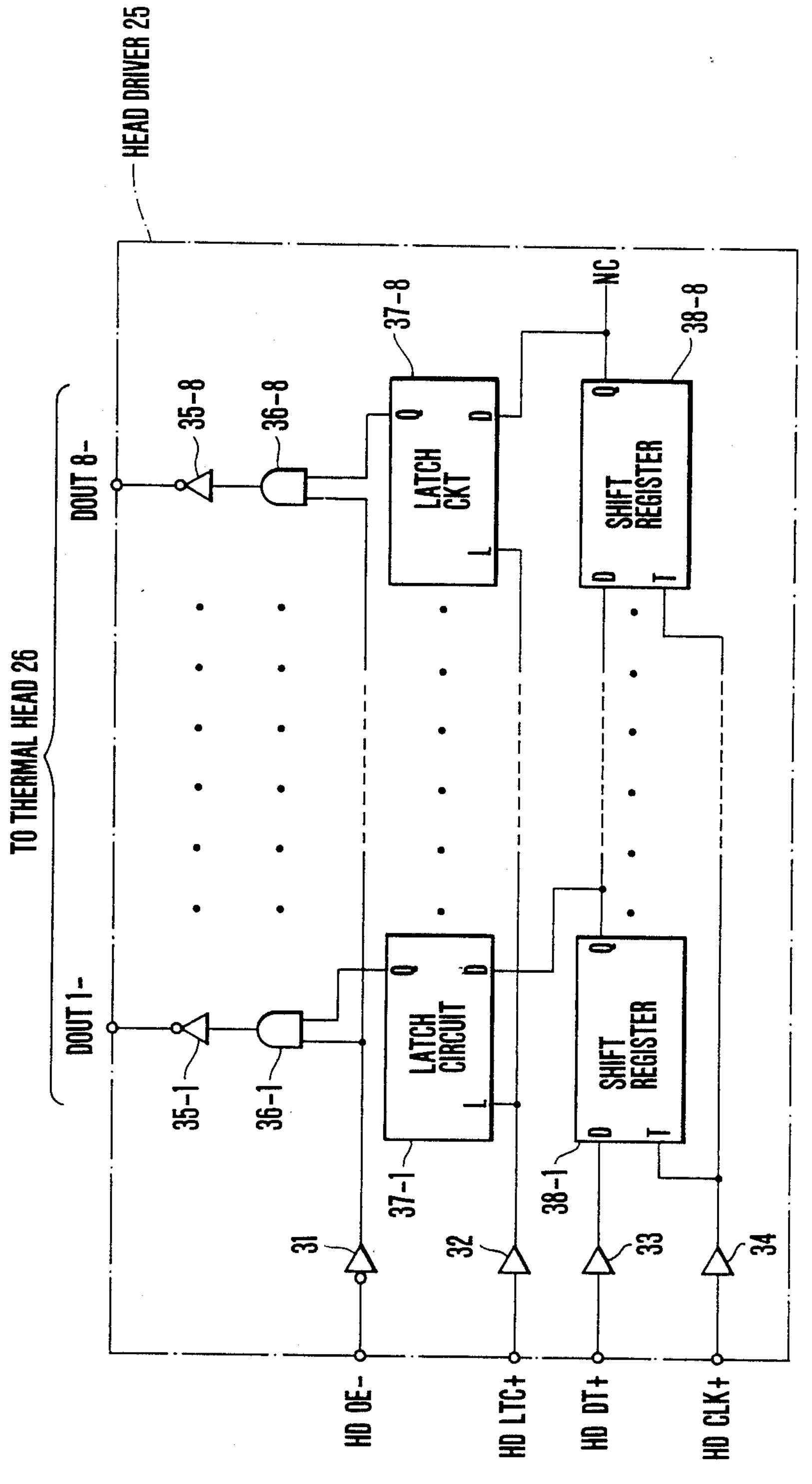
FIG. 3 is a circuit diagram of a thermal driver shown in FIG. 2.

FIG. 3 is a circuit diagram of the head driver 25.

The operations of the circuits shown in FIGS. 2 and 3 will be described below.

Referring to FIG. 2, the gate array 23 which receives data 1 to data 8 from the host computer 2 through the line 200 sends the data reception interruption signal to the CPU 21 through the line 201. The CPU 21 analyzes the reception data and performs thermal history control. The CPU 21 detects the ambient temperature of the head on the basis of the head grade data from the head grade/head peripheral temperature detector 22 and defines a pulse width of the signal HDOE− supplied to the head driver 25. The CPU 21 sends parallel data D0 to D7 edited by history control and the head driver clock signal to the gate array 23 through the corresponding lines 202 and 205. The gate array 23 causes the parallel/serial converter 24 to convert the parallel data into the serial data in synchronism with the head driver clock signal and sends the signals HDDT+ and HDCLK+ to the head driver 25. Thereafter, the CPU 21 sends the enable signal HDOE− and the latch signal HDLTC+ to the head driver 25. The signal HDDT+ sent from the gate array 23 to the head driver 25 is written in registers 38-1 to 38-8 at the leading edge of the signal HDCLK+. The contents of the shift registers 38-1 to 38-8 are latched by latch circuits 37-1 to 37-8 at the leading edge of the signal HDLTC+ supplied from the CPU 21. The data latched by the latch circuits 37-1 to 37-8 are supplied as output signals DOUT1 to DOUT8 through AND gates 36-1 to 36-8 and inverters 35-1 to 35-8 to energize the corresponding heating resistor elements R.

Thermal history control will be described in detail below.

Figure 4:
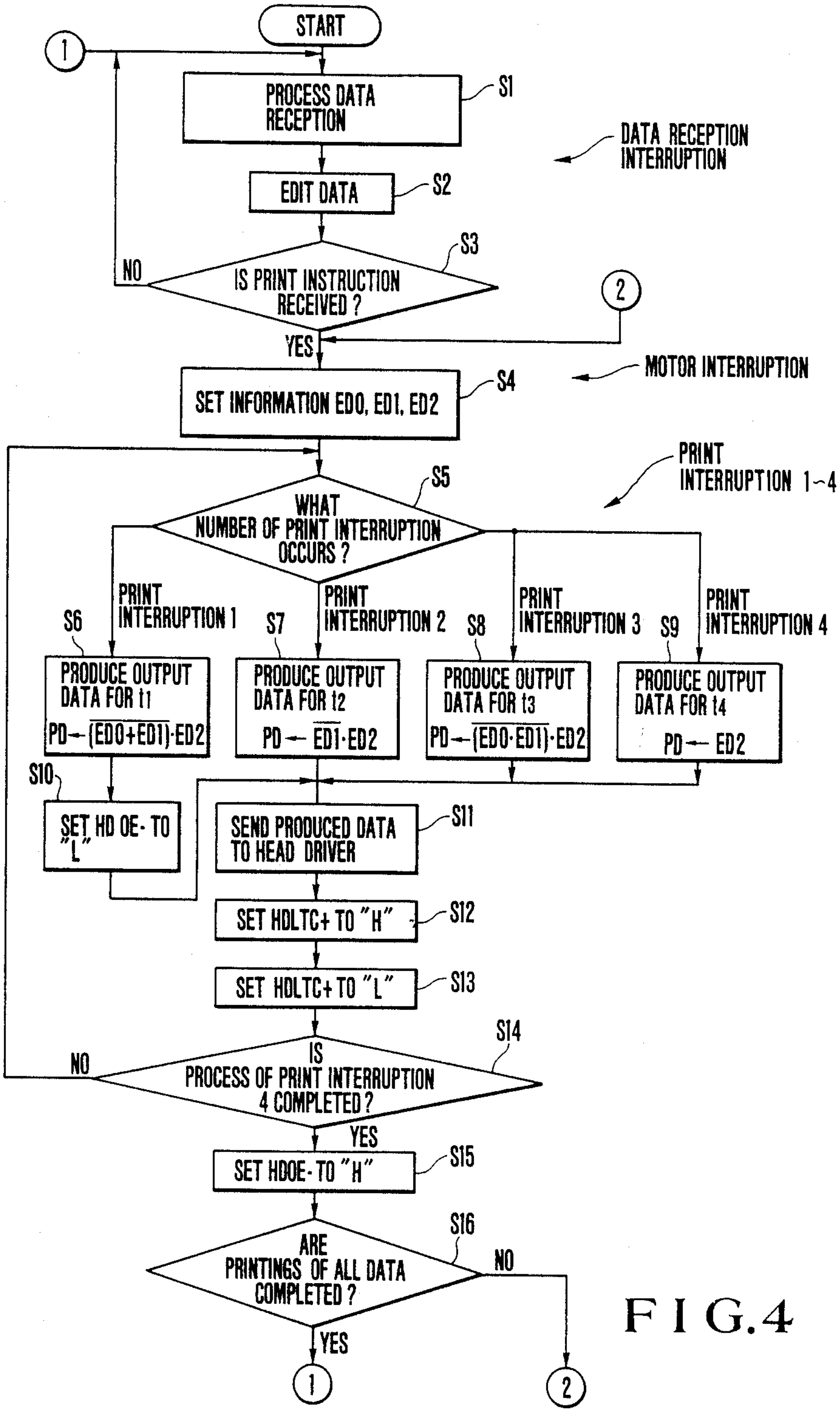
FIG. 4 is a flow chart showing an operation of the printing control apparatus shown in FIG. 2.

FIG. 4 is a flow chart showing the operation of history control.

Referring to FIG. 4, when the reception data interruption from the host computer 2 is detected in step S1, the CPU 21 performs reception data processing and editing using the CG font (S2). These operations are repeated, and the CPU waits for a print instruction. When a print instruction is detected in step S3, the two-step, one-step previous printing data or information E0 and E1, and the current-step printing data or information E2 are set by a motor interruption, and the head position is set. In step S5, the CPU 21 checks the factor of the print interruption representing a print interruption. At first, the print interruption is associated with the time interval t1, and the flow advances to step S6. $(\overline{ED0}+\overline{ED1})\cdot ED2$ is calculated as the output data and is stored in a register PD. The enable signal HDOE− is set at low level, and the printing time is initiated (FIG. 5(*a*)). The output data (Dot 1) in the register PD is sent to the head driver 25 (S11).

The signal HDLTC+ is set at "H" level, and this data is sent to the head 26 (S12). Thereafter, the signal HDLTC+ is set at "L" level (S13). Information is printed by the head. The CPU 21 checks in step S14 whether a print interruption 1 is completed. Since YES in step S14, the flow returns to step S5. A print interruption 2 associated with the time interval t2 is generated. In step S7, $\overline{ED1}\cdot ED2$ is calculated, and the calculated data is sent to the head driver 25. The operations in steps S11 to S14 are performed, and the print information is sent to the head 26 and printed thereby. The flow returns to step S15. A print interrupt 3 associated with the time interval t3 is input. In step S8, $\overline{ED0\cdot ED1})\cdot ED2$ is calculated, and the calculated data is sent to the head 26. The print interrupt 4 associated with the time interval t4 is generated, and data ED2 is sent to the head 26 and printed thereby. One-dot line printing is completed. If YES in step S14, the flow advances to step S15. The enable signal HDOE− is set at "H" level, and the flow advances to step S16. The CPU 21 checks in step S16 whether printing of all data is completed. If NO in step S16, the flow returns to step S4, and the head position is changed in accordance with a motor interruption. The above operations are then repeated. When printing of all data is completed, the flow returns to step S1.

FIGS. 5(*a*) to 5(*h*) are timing charts showing timings of the signals when the third dot line in Table 4 is to be printed.

The output signals DOUT1 to DOUT4 (FIGS. 5(*e*) to 5(*h*)) supplied from the head driver 25 to the head 26 to control the ON/OFF operation of the heating resistor elements R can have different levels during the time intervals t1 to t4 even while the enable signal HDOE− is kept at "L" level (in the prior art, these levels are the same when the enable signal level is kept at a predetermined level).

In the printing control system for a thermal printer according to the present invention as described above, the printing densities of the respective heating resistor elements can be controlled on the basis of the respective heat accumulation. Therefore, a nonuniform density distribution can be greatly improved.

What is claimed is:

1. A method of controlling printing in a thermal printer, the method being adapted to control a printing density of a dot corresponding to each of a plurality of heating resistor elements by controlling energization times of the plurality of heating resistor elements, wherein dot energization times of a heating resistor element corresponding to a printing dot to be printed in a line at a current step are determined on the basis of a printing data printed in the same line at least one and two printing dots ahead of the current printing dot.

2. A method according to claim 1, wherein a printing time of the current printing data is divided into a plurality of time intervals, and logical operations are performed according to different algorithms using the printing data printed in the line at least one and to printing dot ahead of the current printing dot every time interval so as to perform appropriate printing for each time interval, and the density of the current printing data is determined by combining printing data of previous time intervals.

3. A printing control apparatus in a thermal printer, comprising a recording head having a plurality of heating resistor elements, processor means for preparing and storing data sent from a host computer and calculating and outputting current printing data to be printed in a line on the basis of printing data printed in the same line at least one and two printing dots ahead of a current printing dot, means for parallel/serial converting output data from said processor means, and head driver means for generating an ON/OFF pulse signal for heating resistor elements of said recording head on the basis of output data from said parallel/serial converting means.

4. An apparatus according to claim 3, wherein said processor means comprises means for dividing a printing time of the printing data into a plurality of time intervals, performing logical operations according to different algorithms using the printing data printed in the line at least one and two printing dots ahead of the current printing dot every time interval, and outputting printing data in units of time intervals, means for generating an enable signal representing the printing time of the data and supplying the enable signal to said head driver means, and means for generating a clock signal and a latch signal at timings respectively corresponding to the plurality of time intervals and for causing said head to print the printing data in units of time intervals.

5. An apparatus according to claim 4, wherein said driver means comprises shift register means for storing the printing data supplied for every one of said time intervals from said parallel/serial converting means in response to the clock signal supplied from said processor means, latch means for latching the data from said shift register in response to the latch signal supplied from said processor means, and means for sending as an ON/OFF signal the data to said head from said latch means in response to the enable signal supplied from said processor means.

* * * * *

UNITED STATES PATENT AND TRADEMARK OFFICE

CERTIFICATE OF CORRECTION

PATENT NO. : 4,983,989

DATED : 1/8/91

INVENTOR(S) : Komuro et al

It is certified that error appears in the above-identified patent and that said Letters Patent is hereby corrected as shown below:

Col. 4, line 5, delete "ED1", insert --$\overline{ED1}$--

Col. 4, line 14, after "operator", insert --.--

Col. 4, line 31, delete "$\overline{(0,0,0,0) + (0,0,0,0)}$," insert --$\overline{((0,0,0,0) \cdot (0,0}$,0,0))--

Col. 6, line 15 delete "$\cdot\overline{ED2}$", insert ---·ED2--.

Signed and Sealed this

Eighth Day of September, 1992

*Attest:*

DOUGLAS B. COMER

*Attesting Officer* *Acting Commissioner of Patents and Trademarks*